US010415988B2

(12) United States Patent
Emory et al.

(10) Patent No.: US 10,415,988 B2
(45) Date of Patent: Sep. 17, 2019

(54) INTEGRATION OF HOURS OF SERVICE AND NAVIGATION

(71) Applicant: OMNITRACS, LLC, Dallas, TX (US)

(72) Inventors: Gene Emory, San Diego, CA (US); Jon Van Winkle, San Diego, CA (US)

(73) Assignee: OMNITRACS, LLC, Dallas, TX (US)

(*) Notice: Subject to any disclaimer, the term of this patent is extended or adjusted under 35 U.S.C. 154(b) by 854 days.

(21) Appl. No.: 14/794,601

(22) Filed: Jul. 8, 2015

(65) Prior Publication Data

US 2016/0011001 A1 Jan. 14, 2016

Related U.S. Application Data

(60) Provisional application No. 62/022,059, filed on Jul. 8, 2014.

(51) Int. Cl.
*G01C 21/34* (2006.01)
*G07C 5/08* (2006.01)
*G06Q 10/06* (2012.01)

(52) U.S. Cl.
CPC ..... *G01C 21/3492* (2013.01); *G01C 21/3407* (2013.01); *G06Q 10/063116* (2013.01); *G07C 5/08* (2013.01)

(58) Field of Classification Search
CPC combination set(s) only.
See application file for complete search history.

(56) References Cited

U.S. PATENT DOCUMENTS

| 6,526,341 | B1 * | 2/2003 | Bird | G07C 5/008 340/573.1 |
| 6,801,855 | B1 * | 10/2004 | Walters | G01S 19/49 340/995.1 |
| 6,807,481 | B1 * | 10/2004 | Gastelum | G01C 21/3697 340/438 |
| 7,827,051 | B2 * | 11/2010 | Sanchez | G06Q 10/0631 705/338 |
| 8,483,943 | B2 * | 7/2013 | Geelen | G01C 21/3655 701/431 |
| 8,938,358 | B1 * | 1/2015 | Shynar | G01C 21/3617 701/533 |
| 8,958,983 | B2 * | 2/2015 | Hilbrandie | G01C 21/32 701/400 |
| 2005/0273250 | A1 * | 12/2005 | Hamilton | G01C 21/3492 701/532 |
| 2007/0208498 | A1 * | 9/2007 | Barker | G08G 1/0104 701/117 |
| 2008/0140309 | A1 * | 6/2008 | Jendbro | G01C 21/3614 701/533 |
| 2011/0118975 | A1 * | 5/2011 | Chen | G01C 21/3438 701/533 |
| 2011/0218702 | A1 | 9/2011 | Larschan et al. | |
| 2013/0226915 | A1 * | 8/2013 | Scofield | G06F 17/3087 707/724 |

(Continued)

*Primary Examiner* — Redhwan K Mawari
(74) *Attorney, Agent, or Firm* — Arent Fox LLP

(57) ABSTRACT

In an example system, an hours of service system may be integrated with a navigation system and configured to dynamically change a driver's route based on changing real time conditions and remaining hours of service. This system may then automatically route a driver to a new, e.g. closer, stop when necessary so that the driver and his carrier may comply with an hours of service requirement.

20 Claims, 5 Drawing Sheets

(56) References Cited

U.S. PATENT DOCUMENTS

| | | | |
|---|---|---|---|
| 2013/0290199 A1* | 10/2013 | Camacho | G01S 19/49 705/317 |
| 2013/0322665 A1* | 12/2013 | Bennett | G08G 1/096855 381/300 |
| 2014/0058772 A1* | 2/2014 | Moskos | G06Q 30/08 705/6 |
| 2014/0094992 A1 | 4/2014 | Lambert et al. | |
| 2014/0094995 A1 | 4/2014 | Scott | |
| 2014/0121893 A1 | 5/2014 | Larschan et al. | |

* cited by examiner

INTEGRATION OF HOURS OF SERVICE AND NAVIGATION

CLAIM OF PRIORITY

This is an application claiming priority to Provisional Application No. 62/022,059 entitled "INTEGRATION OF HOURS OF SERVICE AND NAVIGATION IN REAL-TIME," filed on Jul. 8, 2014, and assigned to the assignee hereof and hereby expressly incorporated by reference herein.

BACKGROUND

The application pertains to navigation systems for managing routes of drivers, and more particularly to a navigation system that integrates hours of service and navigation to reroute a driver to a new stop.

Currently, dispatchers are responsible for routing drivers. For example, a dispatcher sends a driver a preplanned travel route, which may have one or more preplanned stops based on the projected travel time and the maximum number of driving hours for the particular driver. However, road conditions (e.g., weather, traffic, construction, etc.) change dynamically, and as a result the driver may not be able to achieve the average speeds presumed by the dispatcher. This can result in the driver not having enough remaining driving hours to reach the preplanned stop. When this happens, the driver may notify the dispatcher, who may then find the driver another stop along his route; but, if the dispatcher is not available, the driver may choose to continue driving to the pre-planned stop outside of compliance for his maximum driving hours, which is undesirable. Also, problems may arise when the driver is in a remote area where nearby stops are not available. This may cause the driver to drive out of compliance with their hours of service requirements, increasing the risk for civil penalties and crashes from fatigue. Potential changes in driving regulations make compliance with driving hours requirements more of a concern for carriers that could be forced to pay civil penalties when their drivers are out of compliance.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, an hours of service (HOS) system is integrated, e.g., in a computing device, with a navigation system for a vehicle, where the system is configured to dynamically change a driver's route based on changing real time conditions (e.g., traffic) and his remaining hours of service (e.g., work hours or driving hours). The integrated HOS/navigation system may automatically route a driver to a closer rest stop when necessary so that the driver and his carrier may comply with the hours of service requirements. In one scenario, for example, the integrated hours of service and navigation may allow drivers to seamlessly comply with hours of service requirements while on the road by at least periodically comparing remaining hours to the estimated time of arrival of the planned trip, with the system automatically providing the driver with directions to a suitable rest stop when a stop is required to comply with regulations or company policy.

In an aspect of the disclosure, for example, a method for dynamic integration of hours of service and navigation may include receiving, by a transceiver via a communication link, a navigation route for a vehicle, wherein the navigation route includes an original stopping point; determining, by a processor, remaining hours of driving of a driver associated with the vehicle. Further, the method may include determining, by the processor, the driver's remaining hours of work; determining, by the processor, an estimated time of arrival (ETA) at the original stopping point of the navigation route. Also, the method may include determining, by the processor, whether a time to the ETA exceeds either of the driver's remaining hours of driving or the remaining hours of work. Additionally, the method may include automatically changing the navigation route, by the processor, to include a new stopping point that is predicted to be reachable within the driver's remaining hours of work and remaining hours of driving in response to determining that the time to the ETA exceeds either of the driver's remaining hours of driving or the remaining hours of work.

In another aspect of the disclosure, for example, a computing device may include a transceiver configured to receive a navigation route for a vehicle, wherein the navigation route includes an original stopping point. The computer device may also include a processor in communication with the receiver, where the processor includes an hours of service (HOS) module configured to determine remaining hours of driving of a driver associated with the vehicle, the driver's remaining hours of work, and an estimated time of arrival (ETA) to the original stopping point. The processor may also include an HOS manager module configured to determine whether the time to the ETA (ETA-current time) exceeds either of the driver's remaining hours of driving or the remaining hours of work. Further, the processor may also include a navigation module configured to automatically change the navigation route to include a new stopping point that is predicted to be reachable within the driver's remaining hours of work and remaining hours of driving in response to determining that the time to the ETA exceeds either of the driver's remaining hours of driving or the remaining hours of work.

In a further aspect of the disclosure, for example, a computer readable medium stores computer executable code for dynamic integration of hours of service and navigation. The stored code may include code for receiving a navigation route for a vehicle, wherein the navigation route includes an original stopping point, code for determining remaining hours of driving of a driver associated with the vehicle, and code for determining the driver's remaining hours of work. The stored code may further include code for determining an estimated time of arrival (ETA) the original stopping point, code for determining whether a time to the ETA exceeds either of the driver's remaining hours of driving or the remaining hours of work, and code for automatically changing the navigation route to a new stopping point that is predicted to be reachable within the driver's remaining hours of work and remaining hours of driving in response to determining that the time to the ETA exceeds either of the driver's remaining hours of driving or the remaining hours of work.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
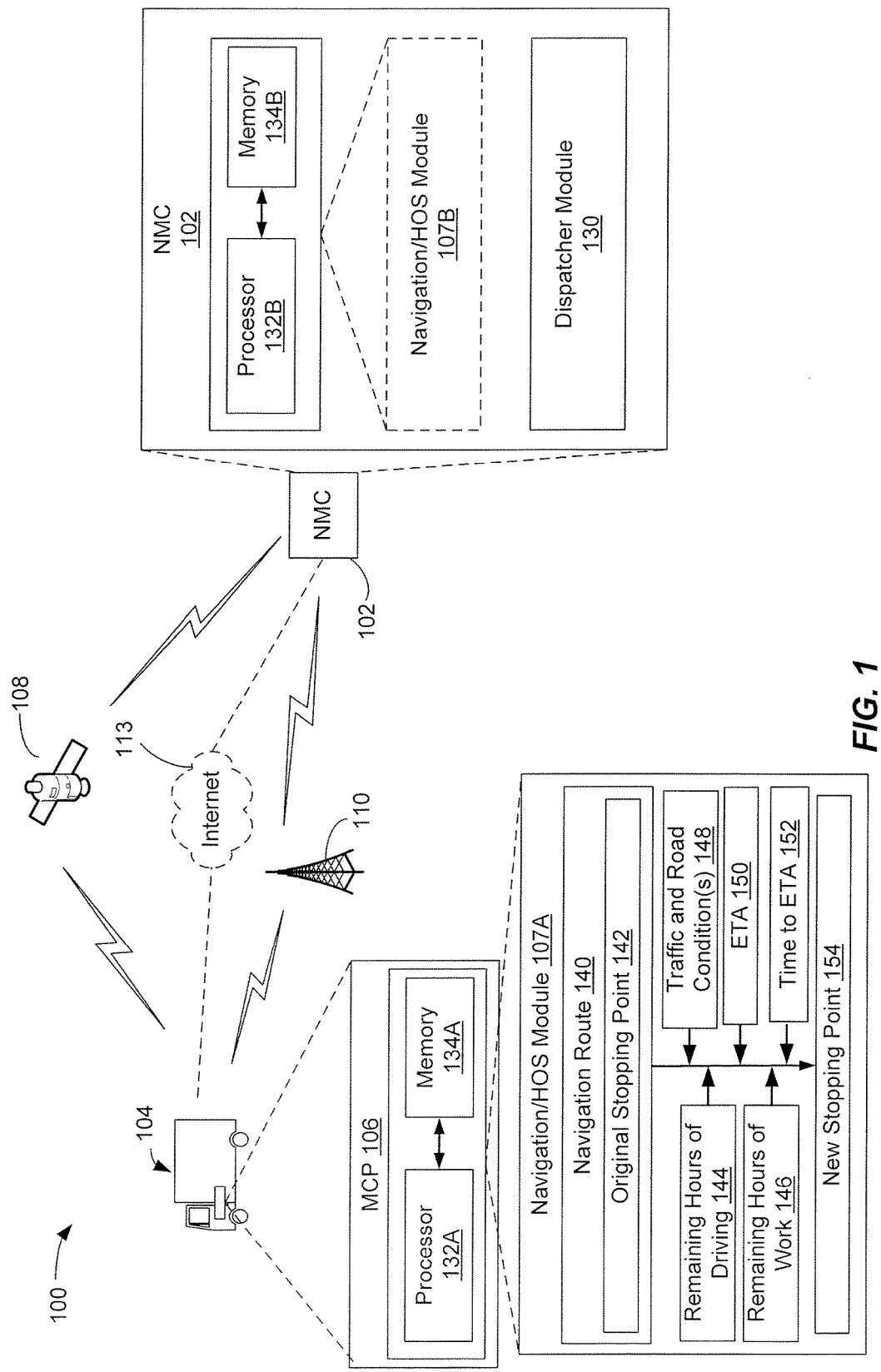
FIG. 1 is a schematic diagram of a system including a mobile computing device, located on a vehicle, including an integrated HOS and navigation module that may reroute a vehicle, in real-time, to a new stopping point based on traffic and road conditions and an available amount of remaining hours of service or work.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

In an aspect, a single integrated navigation/HOS module may be implemented on a computer system and may act as the in-cab solution for a driver of a vehicle, such as a truck or tractor trailer, providing both navigation and hours-of-service (HOS) compliance functionality. The navigation/HOS module may act as the vehicle's primary navigation system, integrating GPS with map information to support the driver with routing and driving directions. The navigation/HOS module may also track the driver's working hours and driving hours. For example, in an aspect, the driver may toggle on-screen inputs to start countdown timers on the navigation/HOS module to calculate the driver's remaining work hours and/or driving hours. For instance, the driver may have 14 hours of available work time in a day, but only 11 hours of driving time, e.g., based on a government or carrier (e.g., truck fleet owner) requirement. When the driver presses a button on the navigation/HOS module (e.g., a button labeled "Start Work Hours"), the navigation/HOS module may count down the available work hours for the driver. The navigation/HOS module may also utilize GPS data to determine when the vehicle is in motion or above a threshold speed (e.g., 15 MPH), indicating that the driver is driving. If the vehicle is above a threshold speed, the navigation/HOS module may start a drive-time countdown timer that tracks the driver's remaining driving hours. The navigation/HOS module may take into consideration the traffic, construction, weather, speed limits, or any other condition that may affect the speed of the vehicle, in calculating the estimated time of arrival to the planned stop or destination of a planned route. If the time to reach the planned stop or destination exceeds the amount of available work hours or driving hours, the navigation/HOS module may identify a new, previously unplanned stop along the driver's original planned driving route that is reachable within the driver's remaining hours of service, and reroute the driver to the new stop when necessary to remain in compliance with work time and/or driving time requirements.

As such, the described aspects may relate to the integration of the navigation system with the hours of service system with the added functionality of rerouting the driver in real-time based on changing traffic and road conditions that affect a speed of a vehicle. In a further aspect, upon rerouting the driver, the rerouting information (e.g., new driving directions and/or identification of the new stopping point) may be transmitted to a network management center and/or a dispatcher or dispatcher module associated with the vehicle.

FIG. 1 illustrates an example system 100 in which integration of HOS and navigation may be implemented to reroute a vehicle, in real-time, to a new stopping point based on traffic and road conditions and an available amount of remaining hours of service or work. System 100 may include one or more modules for dynamically rerouting a driver based on real-time conditions. As used herein, the term "module" may one of the parts that make up a device, may be hardware or software or firmware, or a combination thereof, and may be divided into other modules and/or distributed across one or more processors.

In an aspect, system 100 may include an integrated navigation/HOS module 107A that resides at a mobile computing platform (MCP) 106 (e.g., a specially programmed computer) located on a vehicle 104 or associated with a driver of vehicle 104. In an additional or alternative implementation in which the aspects described herein a performed remote from MCP 106 and vehicle 104 and/or distributed between MCP 106 and one or more remote computing devices, system 100 may include an integrated navigation/HOS module 107B that resides at a network entity, e.g., network management center (NMC) 102, in communication with MCP 106. In an aspect, navigation/HOS module 107B may be substantially similar or identical to navigation/HOS module 107A. Unless differentiation is needed, navigation/HOS module 107A and 107B may be referenced collectively as "navigation/HOS module 107." In an aspect, navigation/HOS module 107 may be implemented as a software application defined by code or instructions stored in a computer-readable medium (e.g., memory 134A or 134B) and executed by a processor (e.g., processor 132A or 132B), and/or as hardware (e.g., one or more specially programmed processor modules of processor 132A or 132B), and/or as firmware.

In some aspects, MCP 106 may include processor 132A specially configured to execute or host navigation/HOS module 107A and/or memory 134A configured to store specially configured computer-readable code that may define all or part of navigation/HOS module 107A and also to store data associated with navigation/HOS module 107A and/or MCP 106. For example, in an aspect, MCP 106 may include, but is not limited to, an MCP200 platform sold by OMNITRACS LLC of Dallas, Tex., which may include the integrated navigation/HOS module 107 that integrates an Hours of Service module (also referred to as or including a Driver Log Module that records driver state information) and a Navigation module and/or In-Cab Navigation module and/or a Trip Manager module and/or a GPS system, all hereby referred to as a navigation system. Additionally, MCP 106 may include additional modules, such as but not limited to, an Analytics Manager module, a Critical Event Reporting module, a Driver Workflow module, an Extended Productivity Suite module, a Fault Monitoring module, an In-Cab Scanning module, an In-Cab Video Training module, a Media Manager module, a Performance Monitoring module with a Fuel Manager module, a Predictive Performance Service module, a Vehicle Maintenance and Inspection Reporting module, and a Web Browsing module.

In some other aspects, rather than being part of or executed by one or a combination of processor 132A and memory 134A, navigation/HOS module 107 itself may include a processor and a memory for integration of HOS and navigation functionality in real-time. Navigation/HOS module 107 may also include a user interface or display, and a communications module (e.g., including one or more transceivers, and one or more of terrestrial (e.g., WWAN and/or WLAN and/or Wi-Fi) and/or satellite modems, and one or more antennae).

As an example only, navigation/HOS module 107A on vehicle 104 may be in bi-directional communication with NMC 102 over at least one communication channel. In the example shown in FIG. 1, vehicle 104 is in bi-directional communication with the NMC 102 over at least one of a satellite-based communication system 108 and a terrestrial-based system 110 (e.g., a wireless communication system using a communication protocol/technology such as, but not limited to, GSM, CDMA, TDMA, WCDMA, EDGE, OFDM, GPRS, EV-DO, LTE, Wi-Fi, Bluetooth, or, when the vehicle is stopped, via a wired connection 113 through the Internet). Depending on many factors, data may be exchanged with the MCP 106 using one or both of the satellite communication system 108 and the terrestrial-based communication system 110. As a similar example, navigation/HOS module 107B on NMC 102 may be in bi-directional communication with MCP 106 over the at least one communication channel as shown in FIG. 1.

In an aspect, different types of data are determined by, collected by, or transmitted to navigation/HOS module 107. Examples of such data may include, but not limited to, driver's hours of working limitation, driver's log information, position data, real-time traffic data, critical events, etc. In some examples, the driver may enter relevant information (e.g., driver log information pertaining to an hours of service or hours working requirement, such as log codes for driver states such as but not limited to on-duty and driving, on-duty but not driving, off-duty, resting/sleeping, etc.) via a graphical user interface provided by navigation/HOS module 107A.

In an aspect, navigation/HOS module 107A may be configured to receive a navigation route 140, including at least one original stopping point 142, for vehicle 104 via satellite-based communication system 108, terrestrial-based system 110, or internet 113 from dispatcher 130 at NMC 102. In this aspect, dispatcher 130 may be configured to calculate the navigation route 140 based on factors including, but not limited to, a current location of vehicle 104, a destination of a load to be carried by vehicle 104, current traffic estimates, and a maximum or available (e.g., maximum minus used) hours of service (or driving hours) and work hours per day of the driver. In an aspect, dispatcher 130 may be a specially programmed module configured as part of NMC 102, or a person with whom the driver communicates via MCP 106, or a combination of both. Also, in an aspect, the at least one original stopping point 142 may be any point along navigation route 140 to the destination of the load to be carried by vehicle 104, or the original stopping point 142 may be the destination. Additionally, in an aspect, navigation route 140 may include driving directions, such as but not limited to identification of roads to take to get to the destination and/or miles on each road and/or turning instructions to get from one road to another. In an aspect, navigation route 140 may include code and/or data configured to be displayed on a graphical user interface of MCP 106 to notify the driver how to get to the destination. Alternatively, instead of receiving navigation route 140 from dispatcher 130, navigation/HOS module 107A may be configured to calculate the navigation route 140 based on the above-noted factors. In any case, for example, as regulated by government authorities (e.g., in the United States, the Federal Motor Carrier Safety Administration) and/or by a carrier (e.g., trucking company) associated with vehicle 104, a driver may have a maximum of 11 driving hours and 14 working hours per day. Thus, in this example, MCP 106, and hence the driver, may receive the navigation route 140 from dispatcher 130 to drive from San Diego, Calif. to an original stopping point 142 located just outside Albuquerque, N. Mex., which may be within the driver's daily available driving hours per day.

At any time when vehicle 104 is en route to the destination, navigation/HOS module 107A may be configured to determine HOS information, including remaining hours of driving 144 and/or remaining hours of work 146 available for the current day for the driver of vehicle 104. In an aspect, navigation/HOS module 107A may be first configured to track a passage of time since vehicle 104 starts moving for the day. The remaining hours of driving 144 may be calculated by subtracting the passage of time from the driver's maximum driving hours for the day. Similarly, the remaining hours of working 146 may be calculated by subtracting the passage of time from when the driver indicated that they started working from the driver's maximum working hours.

Further, navigation/HOS module 107A may then be configured to determine or calculate, based on one or more traffic and road conditions 148, an estimated time of arrival (ETA) 150 at the original stopping point 142 of the navigation route 140. As noted above, original stopping point 142 is a preplanned stop that may be determined along with the navigation route 140 by dispatcher 130 or navigation/HOS module 107A itself before the vehicle 104 starts traversing navigation route 140. The one or more traffic and road conditions 148 may include, but are not limited to, current traffic and road conditions and/or predicted (e.g., future) traffic and road conditions. For example, traffic and road conditions 148 may include and/or be associated with a current or future time, the current or predicted/estimated future location of vehicle 104, current speed (or an average of a plurality of samples of current (e.g., instantaneous) speed over a recent time period; also referred to as current estimated average speed) or predicted future speed of vehicle 104, one or more current or predict traffic flow factors such as but not limited to road accidents, road construction, restrictions imposed by government or private authorities (e.g., lane closure due to traffic control), etc., along or in the vicinity of navigation route 140, current or predicted average speed of other vehicles along one or more portions of navigation route 140, current or predicted (e.g., when vehicle 104 is predicted to also be there) weather conditions at one or more portions of navigation route 140, and any other current or predicted traffic and road conditions between the current location and original stopping point 142.

Navigation/HOS module 107A may then determine whether vehicle 104 can arrive at the original stopping point 142 within the remaining hours of driving 144 and/or the remaining hours of work 146. In other words, navigation/HOS module 107A may calculate a time to the ETA 152 by subtracting the current time from the ETA 150 and may determine if the time to the ETA 152 exceeds the remaining hours of driving 144 or the remaining hours of work 146.

If the time to the ETA 152 exceeds the remaining hours of driving 144 or the remaining hours of work 146, which means vehicle 104 and hence driver will not be able to arrive at original stopping point 142 within the driver's maximum hours of working or hours of service/driving for the day, then navigation/HOS module 107A may be configured to automatically change the navigation route 140 to include a new stopping point 154 that is predicted to be reachable within the remaining hours of driving 144 and remaining hours of work 146 based on traffic and road conditions 148 for the driver. The new stopping point 154 may be selected by navigation/HOS module 107A based on map data 155 that includes identification of and information related to potential stopping points on or near the navigation route 140 and at a location predicted to be reachable within the remaining hours of driving 144 and remaining hours of work 146 for the driver in view of the current location and the traffic and road conditions 148 beyond the current location.

For example, in one scenario, the new stopping point 154 may be a function of calculating how far vehicle 104 can travel at an expected average speed based on current traffic and road conditions up to a first location along navigation route 140, combined with calculating how far vehicle 104 can travel at an expected average speed based on predicted traffic and road conditions from the first location to a second location along navigation route 140, and so on, until vehicle 104 reaches new stopping point 154. For instance, navigation/HOS module 107A may utilize this combination of current and predicted information, when, for example, navigation/HOS module 107A identifies that vehicle 104 is predicted to be in a location on navigation route 140 at some future time where it is known, e.g., based on historical information, e.g., associated with one or more current or predicted traffic flow factors, or logic rules or predicted weather, that the future traffic and road conditions will be different from the current traffic and road conditions, e.g., thereby resulting in a slower or faster average vehicle speed.

As a non-limiting example, navigation/HOS module 107 may be configured to obtain historical traffic data corresponding to respective times and locations along navigation route where the vehicle 104 is estimated to be located. The historical traffic data may include, for example, respective average vehicle speeds along the navigation route 140 on certain days or times (e.g., on weekdays and weekends, on holidays or days close to holidays, during morning or evening rush hours, etc.), average time for roads of the navigation route to be cleared when an accident happens, average travel speed along the navigation route in a particular season, or during a particular type of weather event (e.g., rain, fog, snow, sleet, etc.), and/or any other factor that may affect speed of vehicle 140 along navigation route 140. Further, for example, navigation/HOS module 107 may further be configured to obtain predicted (e.g., future) traffic and road conditions, such as predicted weather information, for the respective times and locations along the navigation route 140 where the vehicle 140 is initially estimated (e.g., based on current traffic and road conditions) to be located. In at least some examples, the predicted weather information may be obtained from a weather information database accessible to the public, e.g., navigation/HOS module 107 may utilize the communications capability of MCP 106 to access a server on the Internet to obtain predicted future weather information. Additionally, for example, navigation/HOS module 107 may further obtain current and predicted traffic flow factors for the respective times and locations along the navigation route where the vehicle is estimated to be located. The current and predicted traffic flow factors may include road accidents, road construction, restrictions imposed by government authorities (e.g., lane closure due to traffic control), etc. In at least some examples, the current and predicted traffic flow factors may be obtained from one or more traffic information databases accessible to the public, e.g., navigation/HOS module 107 may utilize the communications capability of MCP 106 to access a server on the Internet to obtain predicted future weather information, and/or navigation/HOS module 107 may access historical traffic flow information for stored in memory 134A, which may have been downloaded from NMC 102 or some websites on the Internet.

Further, in this example, navigation/HOS module 107 may then determine predicted average speed for different portions along the navigation route 140 in order to estimate where the vehicle 104 will be located based on a combination of current and predicted traffic and road conditions, and specifically in this example based on the current vehicle speed, the current average speed of other vehicles along navigation route 140, the historical traffic data, the predicted weather information, and the current and predicted traffic flow factors. For example, navigation/HOS module 107 may receive information indicating a car accident 100 miles away on the navigation route 140. To determine the predicted average speed along navigation route 140, navigation/HOS module 107 may obtain information including historical traffic data, e.g., average time for clearing a car accident in the area of the car accident, current and predicted weather information in the vicinity of the traffic accident, e.g., the possibility of raining in the area of the car accident, and the current and predicted traffic flow factors, e.g., any ongoing road constructions that affect the traffic in the area of the car accident.

If a difference between the predicted average speed and a current estimated average speed for the respective times and locations along navigation route where the vehicle is estimated to be located is greater than a deviation threshold for one or more of the respective times and locations along navigation route, navigation/HOS module 107 may use the predicted average speed to calculate the estimated time of arrival and to select the new stopping point. That is, if the predicted average speed is substantially different from the current estimated average speed, navigation/HOS module 107 may use the predicted average speed, rather than the current estimated average speed, to calculate the estimated time of arrival and to select the new stopping point.

Navigation/HOS module 107A may perform the above procedure in an iterative manner. In other words, for example, in some aspects, when vehicle 104 is en route to the new stopping point 154, navigation/HOS module 107A may be configured to further modify the location of the new stopping point, e.g., select another new stopping point, in response to real-time and/or predicted traffic and road conditions 148 based on receiving new, e.g., updated real-time and/or predicted traffic and road conditions 148 or based on periodically re-running the above analysis (e.g., after a certain amount of time, or after a certain number of miles have been driven).

Figure 2:
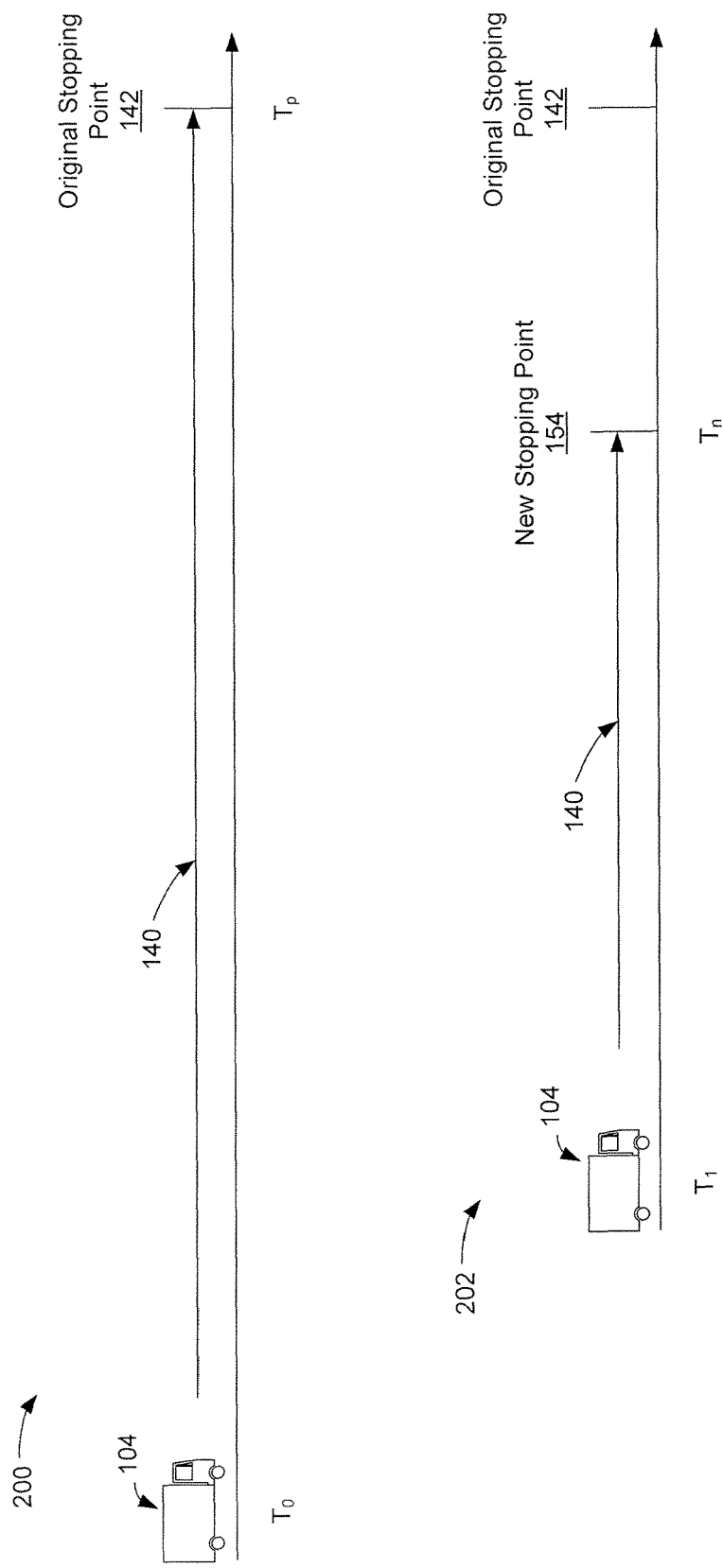
FIG. 2 is a set of graphs depicting an example of a navigation route at an initial time and a changed navigation route at a later time resulting from operation of the integrated HOS and navigation module.

FIG. 2 is an illustration of an example result based on the implementation of navigation/HOS module 107A. As depicted on graph 200, when vehicle 104 starts at an initial time $T_0$, navigation/HOS module 107A may be configured to calculate the navigation route 140 to original stopping point 142, e.g., a preplanned stop or the destination, and calculate the ETA 150 at original stopping point 142 as preplanned stop time $T_P$.

As depicted in graph 202, at a time $T_1$, which is some amount of time after initial time $T_0$, e.g., when vehicle 104 is en route to original stopping point 142, navigation/HOS module 107A may determine whether or not vehicle 104 is able to arrive at original stopping point 142 within the remaining hours of driving 144 and the remaining hours of work 146 of the driver based on a current location of vehicle 104 and based on the traffic and road conditions 148. If a determination is made that vehicle 104 is not able to arrive at original stopping point 142 within the remaining hours of driving 144 and the remaining hours of work 146, navigation/HOS module 107A may be configured to automatically change the navigation route 140 to include new stopping point 154 that is predicted to be reachable within the remaining hours of driving 144 and the remaining hours of work 146, e.g., vehicle 104 can arrive at new stopping point 154 at time $T_n$, which corresponds to an amount of time that is within the remaining hours of driving 144 and the remaining hours of work 146. It should be noted that new stopping point 154 corresponds to a location on navigation route 140 that is short of original stopping point 142, and that $T_n$ may be the same (or close to the same) actual time of day as $T_P$.

Figure 3:
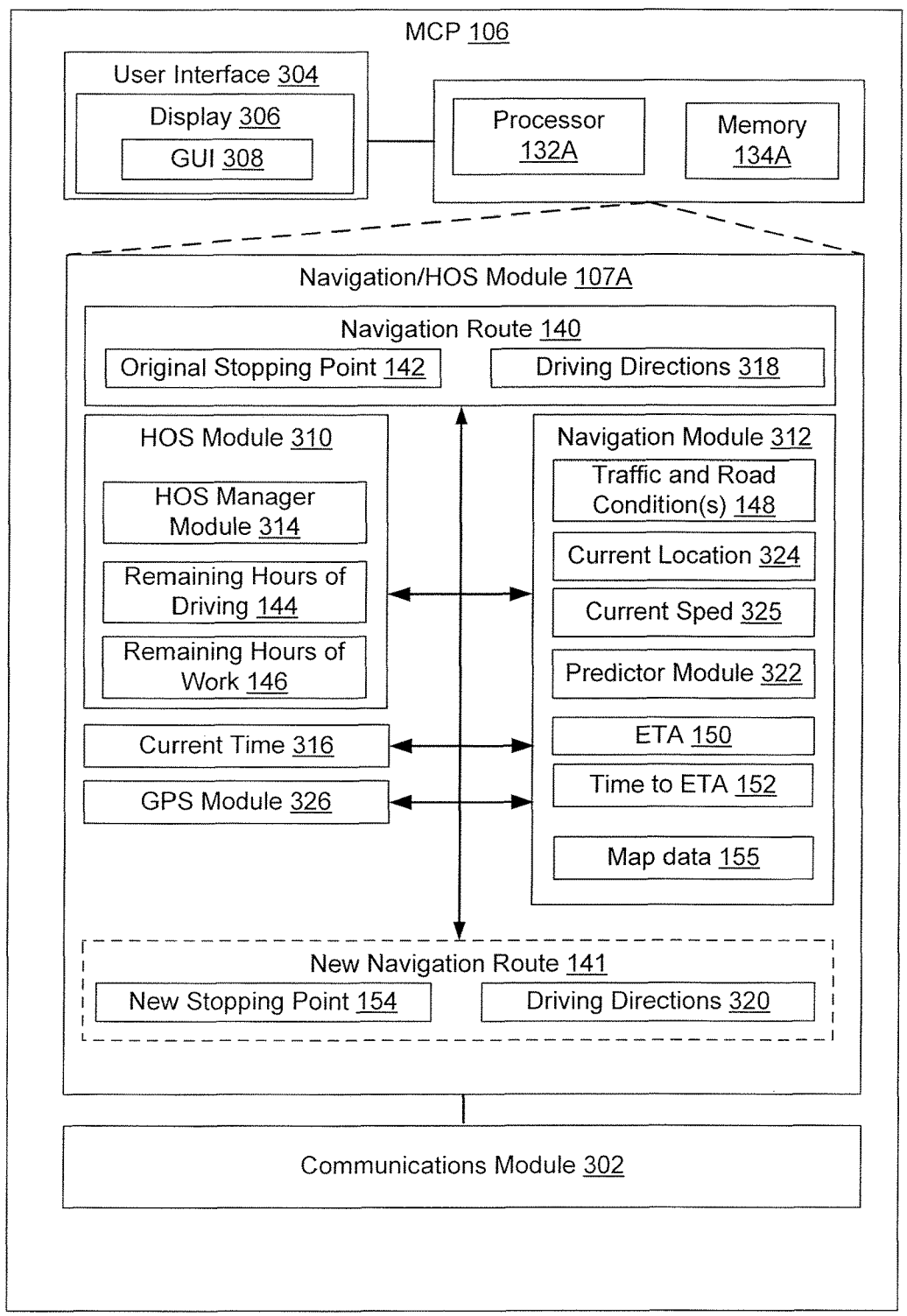
FIG. 3 is a schematic diagram, with more detail than FIG. 1, of an example of various components and subcomponents that may be included in the mobile computing platform and/or the integrated navigation and HOS module of FIG. 1.

FIG. 3 is diagram illustrating an example of MCP 106 and integrated navigation/HOS module 107A. In one implementation, navigation/HOS module 107A may be defined as one or more hardware modules within processor 132A for carrying out one or more of the actions described herein. In another implementation, navigation/HOS module 107A may be defined as one or more sets of computer-readable codes or instructions stored within memory 134A and executable by processor 132A for carrying out one or more of the actions described herein. Processor 132A can include a single processor or multiple processors or a multi-core processor, where portions of navigation/HOS module 107A may be distributed across various ones of the multiple processor or over various parts of the multi-core processor. Memory 134A may be any type of storage medium for storing data used herein and/or local versions of applications or modules being executed by processor 132A. Memory 134A can include any type of memory usable by a computer, such as random access memory (RAM), read only memory (ROM), tapes, magnetic discs, optical discs, volatile memory, non-volatile memory, and any combination thereof. In other implementations, it should be noted that the functionality of navigation/HOS module 107A may be hosted or executed on processor 132B and/or memory 134B at NMC 102 via corresponding navigation/HOS module 107B, such that some portion of the described functionality occurs on MCP 106 and some portion of the functionality occurs at NMC 102.

Further, MCP 106 may further include a communications module 302 that provides for establishing and maintaining communications with one or more entities utilizing hardware, software, and services as described herein. Communications module 302 may carry communications between components of MCP 106 or navigation/HOS module 107A, e.g., via transferring signals via one or more buses connecting such components, as well as between MCP 106 and/or navigation/HOS module 107A and external devices, such as devices located across a communications network and/or devices serially or locally connected to navigation/HOS module 107A. For example, communications module 302 may include one or more buses, and may further include transmit chain components and receive chain components associated with one or more transmitters and receivers, respectively, or one or more transceivers, operable for interfacing with external devices via internet 113 and/or terrestrial-based system 110 and/or satellite-based system 108. For example, communications module 302 may receive navigation route 140 from dispatch module 130 of NMC 102 and forward navigation route 140 to navigation/HOS module 107A. Further, for example, communications module 302 may receive traffic and road conditions 148 from dispatch module 130 and/or one or more external devices (e.g., websites that provide traffic conditions, road conditions, weather conditions, traffic accident notifications; other MCP devices; mobile phones or personal computing devices; or any other type of computer device) and forward traffic and road conditions 148 to navigation/HOS module 107A.

MCP 106 may additionally include a user interface 304 operable to generate outputs from and receive inputs to navigation/HOS module 107A. For example, user interface 304 may include, but is not limited to, a display 306 operable to generate, present, and control a graphical user interface (GUI) 308 that presents a user, e.g., the driver of vehicle 104, with the outputs (e.g., navigation route 140, remaining hours of driving 144, remaining hours of work 146, ETA 150, time to ETA 152, new stopping point 154, etc.) of navigation/HOS module 107A and to receive (or display for selection and receipt by another user interface component) inputs (e.g., driver state information, such as driving, off duty, etc., selections of routes/options, inputs to start/pause/stop the countdown of remaining hours of driving 144, remaining hours of work 146, etc.) from the user/driver for providing to navigation/HOS module 107A. In an aspect, GUI 308 corresponds to signals and data received by user interface 304 from navigation/HOS module 107A based on the operation of navigation/HOS module 107A as described herein. User interface 304 may include one or more input devices and corresponding hardware (e.g., one or more processors) and/or operational software, where the input devices may include, but are not limited to, a touch-sensitive display 306, a keyboard, a number pad, a mouse, a navigation key, a function key, a microphone, a voice recognition module, or any other mechanism capable of receiving an input from a user, or any combination thereof. Further, user interface 304 may include one or more output devices and corresponding hardware (e.g., one or more processors) and/or operational software, where the output devices may include, but are not limited to, display 306, a speaker, a haptic feedback mechanism, a printer, any other mechanism capable of presenting an output to a user, or any combination thereof. An example GUI 308 that may be generated by user interface 304 in response to signals and data from navigation/HOS module 107A is further described in accordance with FIG. 5.

Additionally, in an aspect, navigation/HOS module 107A may include an hours of service module 310 in communication with and/or otherwise integrated with a navigation module 312. As such, hours of service module 310 and navigation module 312 can be any suitable combination of hardware (e.g., one or more processors or processor modules, and/or a memory) and/or software (computer-readable code or instructions), that provides for mass storage of information, databases, logic and programs, and execution of such, employed in connection with aspects described herein.

For example, HOS module 310 may be configured to calculate and store data related to the driver's driving requirements and driving history, e.g., the maximum hours of service/driving per day of the driver, the maximum hours of working per day of the driver, the time elapsed since vehicle started, remaining hours of driving 144 and remaining hours of work 146 and corresponding countdown timers for each, etc. Further, HOS module 310 may further include an HOS manager module 314 configured to determine (e.g., based on a comparison of the respective values) whether the time to the ETA 152 (e.g., a value of time corresponding to the value of ETA 150-minus a value of a current time 316) exceeds either of the driver's remaining hours of driving 144 or the remaining hours of work 146. As such, in an aspect, HOS module 310 and HOS manager module 314 monitor compliance of a driver with any relevant government or carrier regulatory requirements with respect to time driving or time working for a given time period.

Additionally, for example, navigation/module 312 may operate to receive navigation route 140, including original stopping point 142, and generate new stopping point 154 to reroute vehicle 104 and hence driver, in real-time, based on traffic and road conditions 148 and an available amount of either of the driver's remaining hours of driving 144 or the remaining hours of work 146 obtained from communication with HOS module 310. In an aspect, navigation route 140 may further include an original set of driving directions 318, such as but not limited to identification of roads, mileage on each road, and turns that vehicle should take along navigation route 140. In another aspect, navigation module 312 may generate new stopping point 154 along with new driving directions 320, which may be similar to original driving directions 318 but with new road, mileage on road, and turn information that corresponds with directing vehicle 104 to new stopping point 154. Further, navigation module 312 may include a predictor module 322 configured to determine estimated time of arrival (ETA) 150 at a potential stop, e.g., new stopping point 154, along or within a given vicinity of navigation route 140. For example, predictor module 322 may receive as inputs the current location 324 of vehicle 104, e.g., from GPS module 326, current time 316 (which may be received from GPS module 326, or communications module 302 (which may receive current time 316 from a communication network), or from processor 132A (which may maintain current time 316)), current speed 325 (which may be received from GPS module 326 and/or from a local vehicle sensor, such as a speedometer or other sensor associated with a CANbus system on vehicle 104), navigation route 140, and traffic and road conditions 148 associated with one or more portions of navigation route 140. Further, for example, predictor module 322 may further include one or more prediction algorithms, rules, neural networks, logic, etc., that may take into account the route, the distance, the current speed, the current and future predicted or historically known traffic and road conditions, and thereby predict a speed of vehicle 104 along respective portions of navigation route 140, which are then correlated to predicted vehicle locations along navigation route 140 at predicted times. As such, predictor module 322 may predict ETA 150 and time to ETA 152 with respect to original stopping point 142 and/or new stopping point 154. As such, navigation module 312 can exchange this information with HOS module 310 so that HOS module 310 can determine whether the time to the ETA 152 (value of ETA 150 minus a value of current time 316) exceeds either of the driver's remaining hours of driving 144 or the remaining hours of work 146. In addition, if the time to the ETA 152 does exceed either of the driver's remaining hours of driving 144 or the remaining hours of work 146, then navigation module 312 can check the predicted vehicle locations along navigation route 140 at predicted times that fall within the driver's remaining hours of driving 144 and the remaining hours of work 146, correlate such a location with one or more potential stopping points, and automatically change the navigation route 140 to include new stopping point 154 (and new driving directions 320) that is predicted to be reachable within the driver's remaining hours of driving 144 and the remaining hours of work 146 in so that driver (and/or the carrier associated with vehicle 104) can maintain compliance of driver with any relevant government or carrier regulatory requirements with respect to time driving or time working for a given time period.

Figure 4:
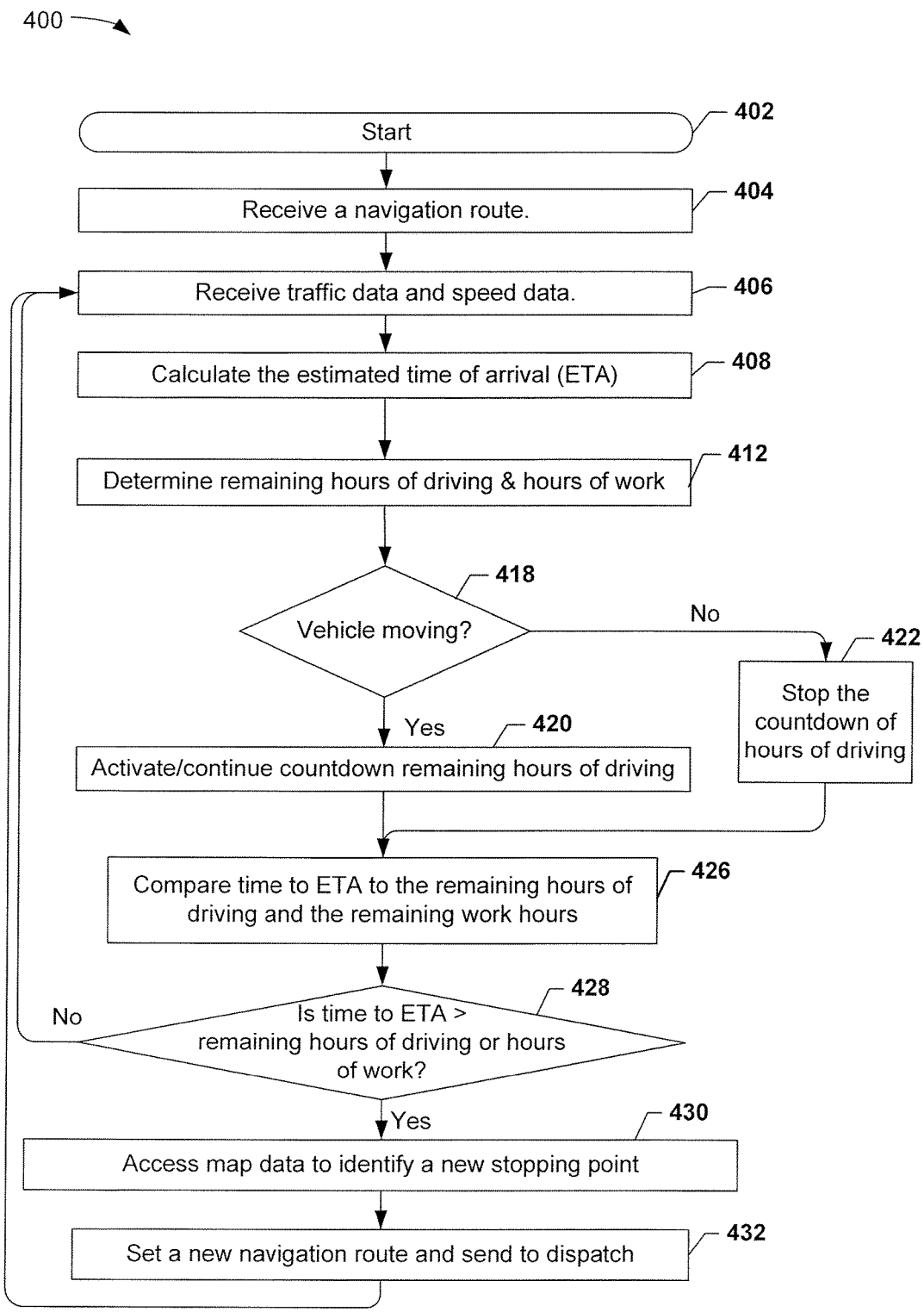
FIG. 4 is a flow chart of an example of a method for dynamic integration of hours of service and navigation, which may be executed by the integrated HOS and navigation module of FIG. 1, for generating a navigation route and rerouting a driver to a new stopping point based on traffic and road conditions and an available amount of remaining hours of service or work.

FIG. 4 illustrates an aspect of a method that may be implemented by the integrated navigation/hour of service ("HOS") module 107A (see FIGS. 1 and 3) for dynamically rerouting a driver to new stopping point 154 based on traffic and road conditions 148 and further based on the driver's remaining hours of driving 144 and the remaining hours of work 146. In block 404, the navigation/HOS module 107A may receive a navigation route 140 from a navigation system or a dispatcher, e.g., dispatcher module 130. In an aspect, the navigation route 140 may be provided by a remote dispatcher, which sends a preplanned navigation route 140 to the navigation/HOS module 107A based on current traffic and road conditions and a full day of driving. For example, a driver typically has a maximum of 11 driving hours and 14 working hours in a day. Thus, the driver may receive a route from the dispatcher to drive from San Diego, Calif. to just outside Albuquerque, N. Mex., which may be within the driver's available driving time.

In block 406, the navigation/HOS module 107A may receive traffic data and road condition(s) data, e.g., traffic and road condition(s) 148 that may include current and/or future predicted traffic and road conditions, and current speed data, e.g., current speed 325 of vehicle 104. In an aspect, the navigation/HOS module 107A may receive traffic and road condition(s) 148 from radio signals, satellite, cellular signals, etc., from remote websites, other MCPs, or any other computer device The navigation/HOS module 107A may determine the current speed 325 by detecting the geographic position (received from GPS module 326) of MCP 106 over time, or current speed 325 may be received as a value from GPS module 326.

In block 408, the navigation/HOS module 107A may calculate the estimated time of arrival ("ETA") 150 to the original stopping point 142 or the new stopping point 154 (if method 400 has already run for one iteration and changed the stopping point) based on the current location 324 and received traffic and road conditions 148 and the current speed 325 of the vehicle 104. As shown in FIG. 4, the calculation of ETA 150 may be performed frequently (e.g., periodically, and/or in response to receiving updated traffic and road condition(s) 148), so that as the vehicle 104 and driver move along the navigation route 140, the ETA 150 to original stopping point 142 or new stopping point 154 is updated.

In block 412, the navigation/HOS module 107A may determine from one or more countdown clocks that track the driver's remaining hours, e.g., the driver's remaining hours of driving 144 and the remaining hours of work 146. These clocks may be started when the driver first reports to the vehicle 104, such as in response to the driver pressing a "Start Work" button and/or a "Start Driving" button, or by entering a driver log code corresponding to "working" or "driving," on the GUI 308 of a touch screen display 306 generated by operation of the navigation/HOS module 107A. For example, if the driver has 14 hours of maximum work time and 11 hours of maximum HOS/driving time, then the countdown will begin counting down from these values.

In determination block 418, the navigation/HOS module 107A may determine whether the vehicle 104 is moving. As an example, the navigation/HOS module 107 may use the functionality of GPS module 326 to calculate current speed 325, or may receive current speed 325 from a speedometer or CANbus system on vehicle 104, and determine whether the current speed 325 exceeds a threshold associated with active driving (such as, but not limited to, a value such as greater than 5 MPH). In an alternative aspect, the driver may press a button on the touch screen (e.g., labeled "Start Driving") of the navigation/HOS module 107A to indicate when he/she is driving or enter a corresponding driver log code. When the navigation/HOS module 107 determines that the vehicle 104 is moving or being driven (e.g., determination block 418="Yes"), the navigation/HOS module 107A activates (or continues to activate) a drive-time or HOS countdown clock (that tracks remaining hours of driving 144) in block 420. When the navigation/HOS module 107A determines that the vehicle 104 is not moving or not being driven (e.g., determination block 418="No"), the navigation/HOS module 107A stops the drive-time or HOS countdown clock in block 422.

In block 426 the navigation/HOS module 107A compares the ETA 150 to the currently tracked value of the remaining hours of driving 144 and the remaining hours of work 146 determined from the respective clocks.

In determination block 428, the navigation/HOS module 107A may determine whether the time to ETA 152 (e.g., the ETA 150 to original stopping point 142 or new stopping point 154 minus current time 316) is greater than the remaining hours of driving 144 and the remaining hours of work 146. If the time to ETA 152 is not greater than both of the remaining hours of driving 144 and the remaining hours of work 146 (e.g., determination block 428="No"), this means that the current navigation route 140 is not forecasted to result in an HOS compliance issue. In this case, the navigation/HOS module 107A may return operation of method 400 to block 406 to continue the process by receiving updated data for traffic and road condition(s) 148 and current speed 325. If the time to ETA 152 is greater than at least one of the remaining hours of driving 144 or the remaining hours of work 146 (e.g., determination block 428="Yes"), then this indicates that the current navigation route 140 to original stopping point 142 or new stopping point 154 would result in an HOS out-of-compliance issue if not revised. As such, in response to this issue, the navigation/HOS module 107A may automatically develop calculate new stopping point 154 along navigation route 140 that is predicted to maintain driver in HOS compliance. The system may do this by accessing map data 155 in block 430 to identify a potential new stopping point, e.g., a rest stop, parking lot, hotel, restaurant, etc., that is along or near the navigation route 140 and at or near a location that the system predicts the vehicle 104 will reach when the driver's remaining hours of driving 144 or the remaining hours of work 146 expires based on traffic and road condition(s) 148 (e.g., obtained in block 406). Additionally, at block 432, the navigation/HOS module 107A may display to the driver the navigation route 140 (or new navigation route 141) to the selected new stopping point 154. As part of block 432, the navigation/HOS module 107 may also send the navigation route 140 (or new navigation route 141) and new stopping point 154 to the dispatcher module 130 so that the NMC 102 and/or carrier or dispatcher is informed of the rerouting. The navigation/HOS module 107A may repeat the process of method 400 by returning to block 406 to receive updated traffic data and speed data.

Figure 5:
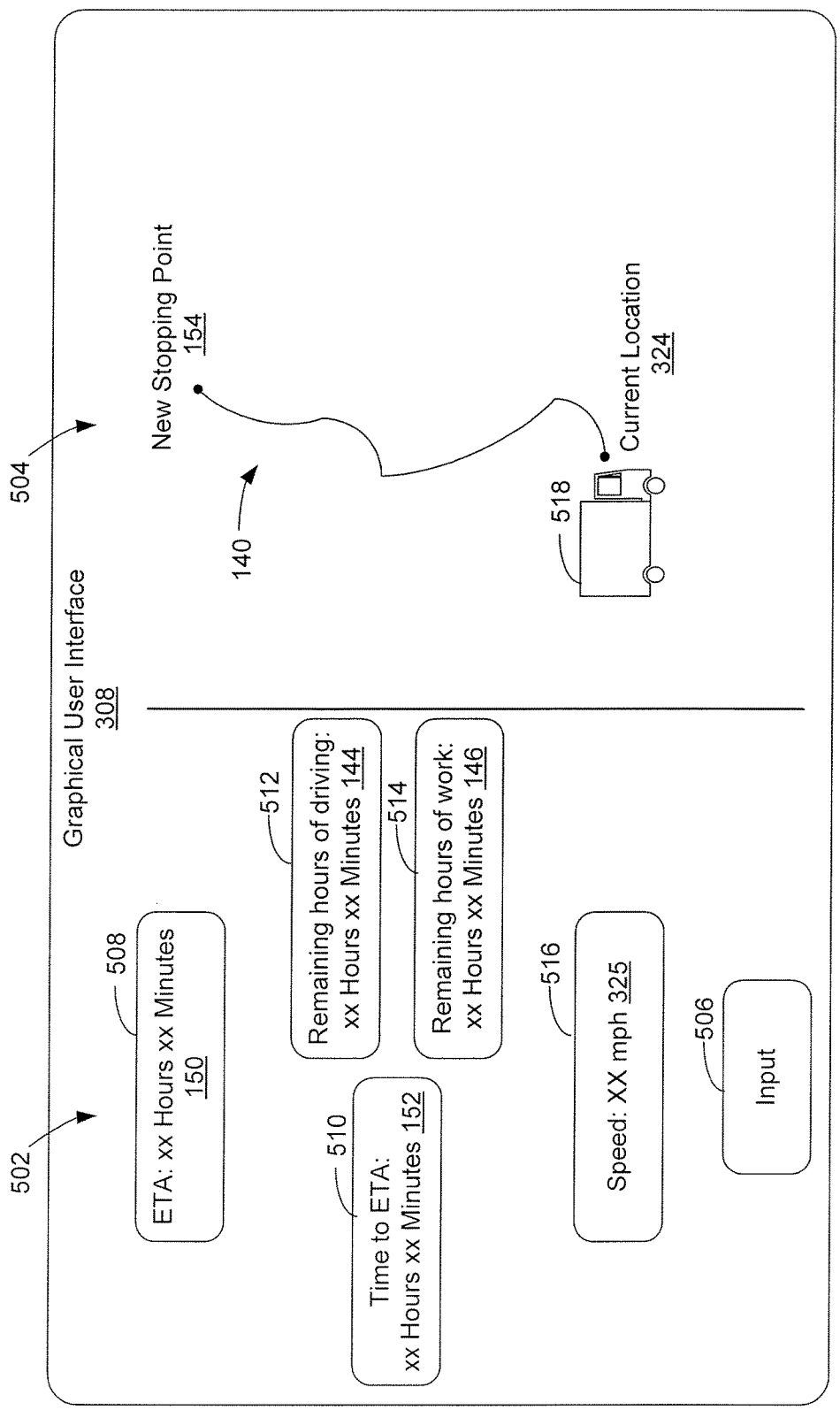
FIG. 5 is a schematic diagram of a graphical user interface that may be generated and controlled by the integrated HOS and navigation module of FIG. 1.

FIG. 5 is an example of one aspect of graphical user interface (GUI) 308 generated by user interface 304 on display 306 based on output signals from integrated navigation/HOS module 107A. As depicted, GUI 308 may include, but is not limited to, a metrics presentation and input portion 502 for displaying relevant HOS compliance information and receiving driver inputs, and a navigation route presentation portion 504 for displaying navigation route 140, including new stopping point 154. For example, metrics presentation and input portion 502 may include, but is not limited to, an input window 506 for receiving driver inputs or activating other windows for receiving driver inputs, an ETA display window 508 for displaying ETA 150, a time to ETA display window 510 for displaying time to ETA 152, a remaining hours of service display window 512 for displaying remaining HOS 144, a remaining hours of driving display window 512 for displaying remaining hours of driving 146, and a speed display window 516 for displaying current speed 325.

For example, when the driver starts vehicle 104, the driver may input, via input window 506, a driver state (e.g., working, driving, etc.) or an input to start the countdown clocks for remaining hours of driving 144 or the remaining hours of work 146, or the maximum hours of service and the maximum hours of work available for the driver, and/or the navigation route 140. Navigation/HOS module 107A may then be triggered to start the countdown of remaining hours of driving 144 and the remaining hours of work 146 and generate signals to display the respective values respectively at remaining hours of service display window 512 and remaining hours of work display window 514.

Further, navigation/HOS module 107A may then be configured to periodically and/or continuously determine or calculate ETA 150 and time to ETA 152, e.g., for comparison to remaining hours of driving 144 and the remaining hours of work 146, and to update progress of a representation 518 vehicle 104 along navigation route 140 and/or to reroute vehicle 104 to new stopping point 154, as described herein.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects may be described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

While the foregoing disclosure discusses illustrative one or more aspects, it should be noted that various changes and modifications could be made herein without departing from the scope of the described aspects as defined by the appended claims. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise.

What is claimed is:

1. A method for dynamic integration of hours of service with a navigation system associated with a vehicle, comprising:
  receiving, by a transceiver via a communication link, a navigation route for a vehicle, wherein the navigation route includes an original stopping point;
  determining, by a processor, remaining hours of driving of a driver associated with the vehicle;
  determining, by the processor, the driver's remaining hours of work;
  determining, by the processor, an estimated time of arrival (ETA) at the original stopping point of the navigation route based at least on one or more of traffic and road conditions;
  determining, by the processor, whether a time to the ETA exceeds either of the driver's remaining hours of driving or the remaining hours of work;
  automatically changing the navigation route, by the processor, to include a new stopping point that is predicted to be reachable within the driver's remaining hours of work and remaining hours of driving in response to determining that the time to the ETA exceeds either of the driver's remaining hours of driving or the remaining hours of work; and
  displaying the navigation route with the new stopping point on a display of a user interface.

2. The method of claim 1, further comprising:
  receiving traffic and road conditions corresponding to the navigation route;
  wherein determining an estimated time of arrival (ETA) at the original stopping point of the navigation route comprises calculating an estimated time of arrival based on a current time, a current location, and the traffic and road conditions between the current location and the original stopping point; and
  selecting the new stopping point based on navigation data of potential stopping points on or near the navigation route and at a location predicted to be reachable within the remaining hours of work and remaining hours of driving in view of the current location and the traffic and road conditions beyond the current location along the navigation route.

3. The method of claim 1, further comprising:
  receiving current traffic and road conditions;
  determining predicted traffic and road conditions;
  wherein calculating the estimated time of arrival further comprises calculating based on a combination of the current traffic and road conditions and the predicted traffic and road conditions; and
  wherein automatically changing the navigation route to include the new stopping point further comprises predicting that the new stopping point will be reachable within the driver's remaining hours of work and remaining hours of driving based on the combination of the current traffic and road conditions and the predicted traffic and road conditions.

4. The method of claim 3, further comprising:
  obtaining historical traffic data corresponding to respective times and locations along navigation route where the vehicle is estimated to be located;
  obtaining predicted weather information for the respective times and locations along the navigation route where the vehicle is estimated to be located;
  obtaining current traffic flow factors for the respective times and locations along the navigation route where the vehicle is estimated to be located;
  determining predicted average speed for the respective times and locations along the navigation route where the vehicle is estimated to be located based on a combination of the historical traffic data, the predicted weather information, and the current traffic flow factors; and
  wherein determining predicted traffic and road conditions comprises:
    determining whether a difference between a current speed for the respective times and locations along navigation route where the vehicle is estimated to be located and the predicted average speed for the respective times and locations along the navigation route where the vehicle is estimated to be located is greater than a deviation threshold for one or more of the respective times and locations along navigation route; and
    using the predicted average speed for one or more of the respective times and locations along the navigation route when the difference exceeds the deviation threshold.

5. The method of claim 1, further comprising:
  determining if the vehicle is moving; and
  initiating a countdown of the remaining hours of driving when a determination is made that the vehicle is moving.

6. The method of claim 5, wherein determining if the vehicle is moving further comprises determining whether a current speed of the vehicle exceeds a threshold associated with active driving.

7. The method of claim 6, further comprising transmitting the new navigation route to a network entity.

8. A computing device, comprising:
  a transceiver configured to receive a navigation route for a vehicle, wherein the navigation route includes an original stopping point;
  a processor in communication with the receiver, the processor including:
    an hours of service (HOS) module configured to determine remaining hours of driving of a driver associated with the vehicle, the driver's remaining hours of work, and an estimated time of arrival (ETA) to the original stopping point;
    a HOS manager module configured to determine whether the time to the ETA (ETA-current time) exceeds either of the driver's remaining hours of driving or the remaining hours of work; and a navigation module configured to automatically change the navigation route to include a new stopping point that is predicted to be reachable within the driver's remaining hours of work and remaining hours of driving in response to determining that the time to the ETA exceeds either of the driver's remaining hours of driving or the remaining hours of work; and a user interface having a display configured to present the navigation route with the new stopping point.

9. The computing device of claim 8,
wherein the transceiver is further configured to receive traffic and road conditions;
wherein the HOS component is further configured to estimate a time of arrival based on the current time, the current location and the traffic and road conditions between the current location and the stop or destination; and
wherein the navigation component is further configured to select the new stopping point based on navigation data of potential stopping points on or near the navigation route and at a location predicted to be reachable within the drivers remaining hours of work and remaining hours of driving in view of the current location and the traffic and road conditions beyond the current location along the navigation route.

10. The computing device of claim 8,
wherein the transceiver is further configured to receive current traffic and road conditions; and
wherein the navigation module is further configured to:
determine predicted traffic and road conditions,
calculate the estimated time of arrival based on a combination of the current traffic and road conditions and the predicted traffic and road conditions, and
predict that the new stopping point will be reachable within the driver's remaining hours of work and remaining hours of driving based on the combination of the current traffic and road conditions and the predicted traffic and road conditions.

11. The computing device of claim 10, wherein the navigation module is further configured to:
obtain historical traffic data corresponding to respective times and locations along navigation route where the vehicle is estimated to be located;
obtain predicted weather information for the respective times and locations along the navigation route where the vehicle is estimated to be located;
obtain current traffic flow factors for the respective times and locations along the navigation route where the vehicle is estimated to be located;
determine predicted average speed for the respective times and locations along the navigation route where the vehicle is estimated to be located based on a combination of the historical traffic data, the predicted weather information, and the current traffic flow factors; and
wherein the navigation module is configured to determine the predicted traffic and road conditions by:
determining whether a difference between a current speed for the respective times and locations along navigation route where the vehicle is estimated to be located and the predicted average speed for the respective times and locations along the navigation route where the vehicle is estimated to be located is greater than a deviation threshold for one or more of the respective times and locations along navigation route; and using the predicted average speed for one or more of the respective times and locations along navigation route when the difference exceeds the deviation threshold.

12. The computing device of claim 8, wherein the HOS module is further configured to:
determine if the vehicle is moving; and
initiate a countdown of the remaining hours of driving when a determination is made that the vehicle is moving.

13. The computing device of claim 1, wherein the navigation module is further configured to generate a new navigation route including new driving directions to the new stopping point.

14. The computing device of claim 13, wherein the transceiver is further configured to transmit the new navigation route to a network entity.

15. A non-transitory computer readable medium storing computer executable code for dynamic integration of hours of service and navigation, comprising:
code for receiving a navigation route for a vehicle, wherein the navigation route includes an original stopping point;
code for determining remaining hours of driving of a driver associated with the vehicle;
code for determining the driver's remaining hours of work;
code for determining an estimated time of arrival (ETA) at the original stopping point of the navigation route based at least on one or more of traffic and road conditions;
code for determining whether a time to the ETA exceeds either of the driver's remaining hours of driving or the remaining hours of work;
code for automatically changing the navigation route to a new stopping point that is predicted to be reachable within the driver's remaining hours of work and remaining hours of driving in response to determining that the time to the ETA exceeds either of the driver's remaining hours of driving or the remaining hours of work; and
code for displaying the navigation route with the new stopping point on a display of a user interface.

16. The computer readable medium of claim 15, further comprising
code for receiving traffic and road conditions,
wherein code for determining an estimated time of arrival (ETA) at a stop or destination of the navigation route comprises:
code for estimating a time of arrival based on the current time, the current location and the traffic and road conditions between the current location and the stop or destination; and
code for selecting the new stopping point based on navigation data of potential stopping points on or near the navigation route and at a location predicted to be reachable within the drivers remaining hours of work and remaining hours of driving in view of the current location and the traffic and road conditions beyond the current location along the navigation route.

17. The computer readable medium of claim 15, further comprising:
code for receiving current traffic and road conditions;
code for determining predicted traffic and road conditions, wherein the code for determining the ETA comprises code for calculating the ETA based on a combination of the current traffic and road conditions and the predicted traffic and road conditions, and wherein code for automatically changing the navigation route to include the new stopping point further comprises code for predicting that the new stopping point will be reachable within the driver's remaining hours of work and remaining hours of driving based on the combination of the current traffic and road conditions and the predicted traffic and road conditions.

18. The computer readable medium of claim 17, further comprising:

code for obtaining historical traffic data corresponding to respective times and locations along navigation route where the vehicle is estimated to be located;

code for obtaining predicted weather information for the respective times and locations along the navigation route where the vehicle is estimated to be located;

code for obtaining current traffic flow factors for the respective times and locations along the navigation route where the vehicle is estimated to be located;

code for determining predicted average speed for the respective times and locations along the navigation route where the vehicle is estimated to be located based on a combination of the historical traffic data, the predicted weather information, and the current traffic flow factors; and wherein code for determining predicted traffic and road conditions comprises:

code for determining whether a difference between a current speed for the respective times and locations along navigation route where the vehicle is estimated to be located and the predicted average speed for the respective times and locations along the navigation route where the vehicle is estimated to be located is greater than a deviation threshold for one or more of the respective times and locations along navigation route; and code for using the predicted average speed for one or more of the respective times and locations along navigation route when the difference exceeds the deviation threshold.

19. The computer readable medium of claim 15, further comprising:

code for determining if the vehicle is moving; and code for initiating a countdown of the remaining hours of driving when a determination is made that the vehicle is moving.

20. The computer readable medium of claim 19, further comprising code for transmitting the new navigation route to a network entity.

\* \* \* \* \*